(12) United States Patent
Yau

(10) Patent No.: US 9,306,462 B2
(45) Date of Patent: Apr. 5, 2016

(54) CONSTANT CURRENT CONTROL CIRCUIT FOR POWER CONVERTER AND CONSTANT CURRENT CONTROL METHOD THEREOF

(71) Applicant: Advanced Analog Technology, Inc., Hsinchu (TW)

(72) Inventor: Yeu-Torng Yau, Tainan (TW)

(73) Assignee: Advanced Analog Technology, Inc., Taiyuan Hi-Tech Industrial Park, Zhubei, Hsinchu County (TW)

( * ) Notice: Subject to any disclaimer, the term of this patent is extended or adjusted under 35 U.S.C. 154(b) by 0 days.

(21) Appl. No.: 14/324,096

(22) Filed: Jul. 4, 2014

(65) Prior Publication Data
US 2015/0138846 A1 May 21, 2015

(30) Foreign Application Priority Data
Nov. 19, 2013 (TW) .............................. 102142114 A

(51) Int. Cl.
*H02M 3/335* (2006.01)
*H02M 1/00* (2007.01)

(52) U.S. Cl.
CPC ...... *H02M 3/33507* (2013.01); *H02M 3/33538* (2013.01); *H02M 3/33546* (2013.01); *H02M 2001/0009* (2013.01); *H02M 2001/0022* (2013.01)

(58) Field of Classification Search
CPC ..................... H02M 3/156; H02M 2001/0009; H02M 2001/0022
USPC .................. 323/282; 363/21.04, 21.05, 21.1
See application file for complete search history.

(56) References Cited

U.S. PATENT DOCUMENTS

| | | | | |
|---|---|---|---|---|
| 2012/0224397 A1* | 9/2012 | Yeh | .................... | H02M 3/33507 363/21.12 |
| 2012/0243269 A1* | 9/2012 | Ren | .................... | H02M 3/33507 363/21.12 |
| 2013/0169182 A1* | 7/2013 | Park | .................. | H02M 3/33507 315/219 |
| 2014/0009080 A1* | 1/2014 | Xu | ..................... | H05B 33/0815 315/224 |
| 2014/0016366 A1* | 1/2014 | Su | ..................... | H02M 3/33507 363/21.12 |
| 2014/0036550 A1* | 2/2014 | Yang | ................. | H02M 3/33523 363/21.12 |
| 2015/0036392 A1* | 2/2015 | Kim | .................... | H02M 1/4258 363/21.13 |
| 2015/0036394 A1* | 2/2015 | Yang | ................. | H02M 3/33507 363/21.18 |

* cited by examiner

*Primary Examiner* — Jessica Han
*Assistant Examiner* — David A Singh
(74) *Attorney, Agent, or Firm* — Winston Hsu; Scott Margo

(57) ABSTRACT

A constant current control circuit includes a sample and hold unit coupled to a current sensing resistor of a power converter, for storing a current sensing voltage of the current sensing resistor; a first capacitor for storing a comparison voltage; a discharge unit coupled between the sample and hold unit and the first capacitor, for controlling a discharge current of the first capacitor according to a reference voltage and the current sensing voltage stored in the sample and hold unit; a charge unit coupled to the first capacitor, for controlling a charging current of the first capacitor according to the reference voltage and a ground voltage; and a comparator for comparing the comparison voltage with the reference voltage to generate a comparison result, and outputting a control signal according to the comparison result, in order to control a duty cycle of the power converter.

8 Claims, 8 Drawing Sheets

CONSTANT CURRENT CONTROL CIRCUIT FOR POWER CONVERTER AND CONSTANT CURRENT CONTROL METHOD THEREOF

BACKGROUND OF THE INVENTION

1. Field of the Invention

The present invention relates to a constant current control circuit for a power converter, and more particularly, to a constant current control circuit for a power converter capable of improving line regulation.

2. Description of the Prior Art

Please refer to FIG. 1. FIG. 1 is a diagram showing a power converter of the prior art. As shown in FIG. 1, the power converter 100 of the prior art comprises a power switch 110 coupled to a primary winding P1 of the power converter 100, and a current sensing resistor Rs coupled to the power switch 110. In order to control the power converter 100 to operate under a constant current mode, a control circuit 120 of the power converter 100 of the prior art is configured to control on and off states of the power switch 110 according to a current sensing voltage Vcs of the current sensing resistor Rs, so as to keep a maximum level of a current Is flowing through the power switch 110 constant, such that an average output current Io of the power converter 100 is kept within a predetermined range.

Please refer to FIG. 2 and FIG. 3, and refer to FIG. 1 as well. FIG. 2 is a diagram showing waveforms of related current signals when an input voltage of the power converter is at a lower level. FIG. 3 is a diagram showing waveforms of related current signals when the input voltage of the power converter is at a higher level. As shown in FIG. 2, when the input voltage Vin of the power converter 100 is at a lower level, the current Is, which flows through the power switch 110, may rise up to a predetermined current level Ip slower, thus a turn-on time length Ton of the power switch 110 is longer. As shown in FIG. 3, when the input voltage Vin of the power converter 100 is at a higher level, the current Is, which flows through the power switch 110, may rise up to the predetermined current level Ip faster, thus the turn-on time length Ton of the power switch 110 is shorter. In addition, when the power switch 110 is turned off, an output current Id at an output end N1 of the power converter 100 drops in a constant speed. Therefore, a turn-off time length Toff of the power switch is a fixed value.

However, according to the above arrangement, the average output current Io outputted at a load end N2 of the power converter 100 may change. For example, as shown in FIG. 2, when the input voltage Vin of the power converter 100 is at the lower level, the power converter 100 outputs the output current Id at the output end N1 three times during a predetermined period T; and as shown in FIG. 3, when the input voltage Vin of the power converter 100 is at the higher level, the power converter 100 outputs the output current Id at the output end N1 four times during the predetermined period T. In other words, when the input voltage yin of the power converter 100 is higher, the average output current Io at the load end N2 is higher as well. Therefore, as shown in FIG. 4, when the input voltage Vin of the power converter 100 is changed, the average output current Io of the power converter 100 has larger variation, that is to say, the power converter 100 of the prior art has bad line regulation under the constant current mode.

SUMMARY OF THE INVENTION

The present invention provides a constant current control circuit for a power converter. The power converter comprises a power switch coupled to a primary winding of the power converter, and a current sensing resistor coupled to the power switch. The constant current control circuit comprises a sample and hold unit, a first capacitor, a discharge unit, a charge unit and a comparator. The sample and hold unit is coupled to the current sensing resistor of the power converter, for storing a current sensing voltage of the current sensing resistor. The first capacitor is for storing a comparison voltage. The discharge unit is coupled between the sample and hold unit and the first capacitor, for controlling a level of a discharge current of the first capacitor according to a reference voltage and the current sensing voltage stored in the sample and hold unit when the power switch is turned off. The charge unit is coupled to the first capacitor, for controlling a level of a charging current of the first capacitor according to the reference voltage and a ground voltage when the power switch is turned on. The comparator is for comparing the comparison voltage with the reference voltage to generate a comparison result, and outputting a control signal according to the comparison result, in order to control a duty cycle of the power converter.

The present invention further provides a constant current control method for a power converter. The power converter comprises a power switch coupled to a primary winding of the power converter, and a current sensing resistor coupled to the power switch. The method comprises storing a current sensing voltage of the current sensing resistor; controlling a level of a discharge current of a first capacitor according to a reference voltage and the current sensing voltage when the power switch is turned off; controlling a level of a charging current of the first capacitor according to the reference voltage and a ground voltage when the power switch is turned on; comparing a comparison voltage stored in the first capacitor with the reference voltage to generate a comparison result; and outputting a control signal according to the comparison result, for controlling a duty cycle of the power converter.

In contrast to the prior art, the constant current control circuit of the power converter of the present invention can compensate an average output current of the power converter according to a change of an input voltage of the power converter, such that variation of the average output current of the power converter is smaller, so as to improve line regulation of the power converter, in order to provide a more stable power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
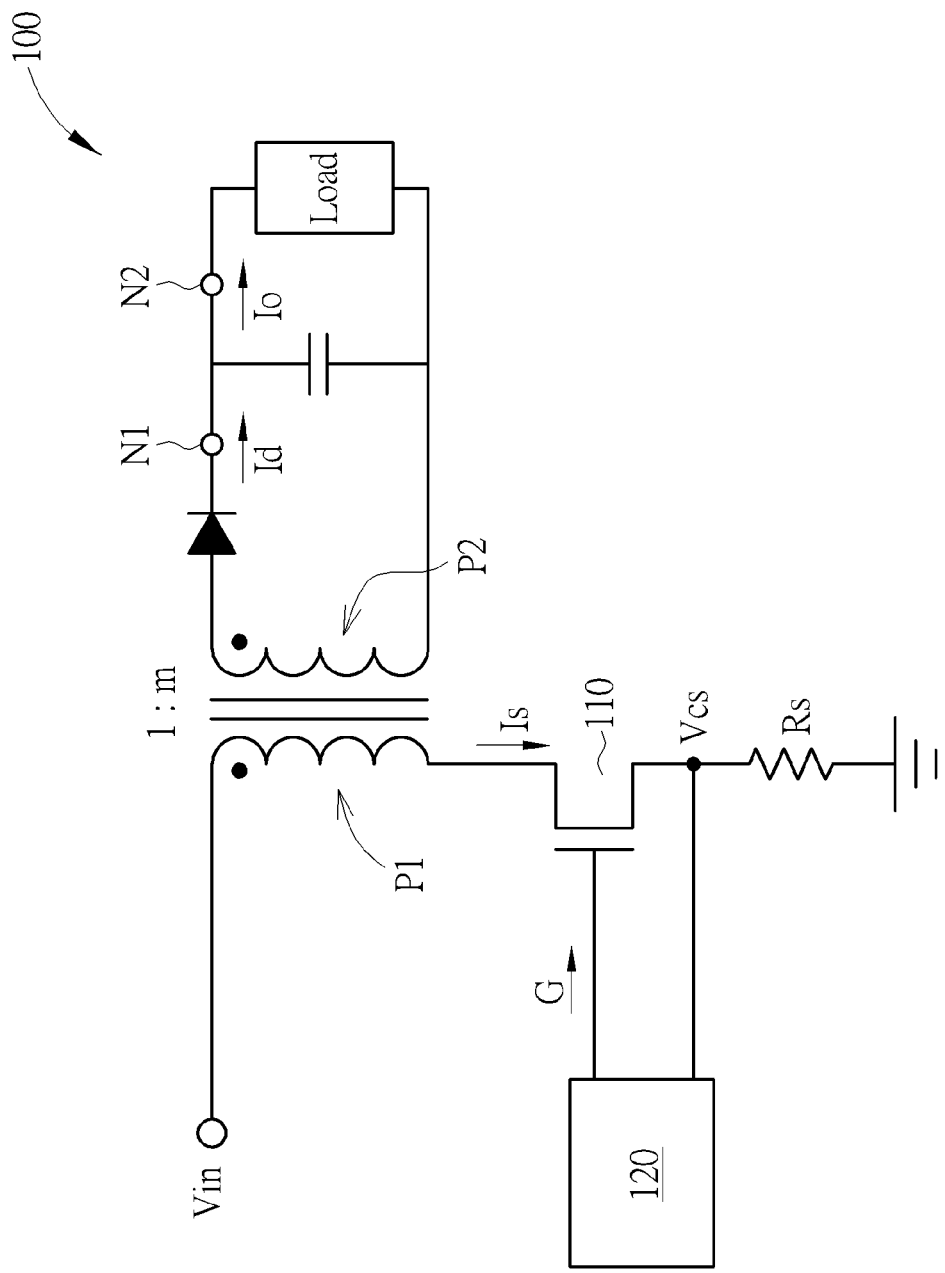
FIG. 1 is a diagram showing a power converter of the prior art.
Figure 2:
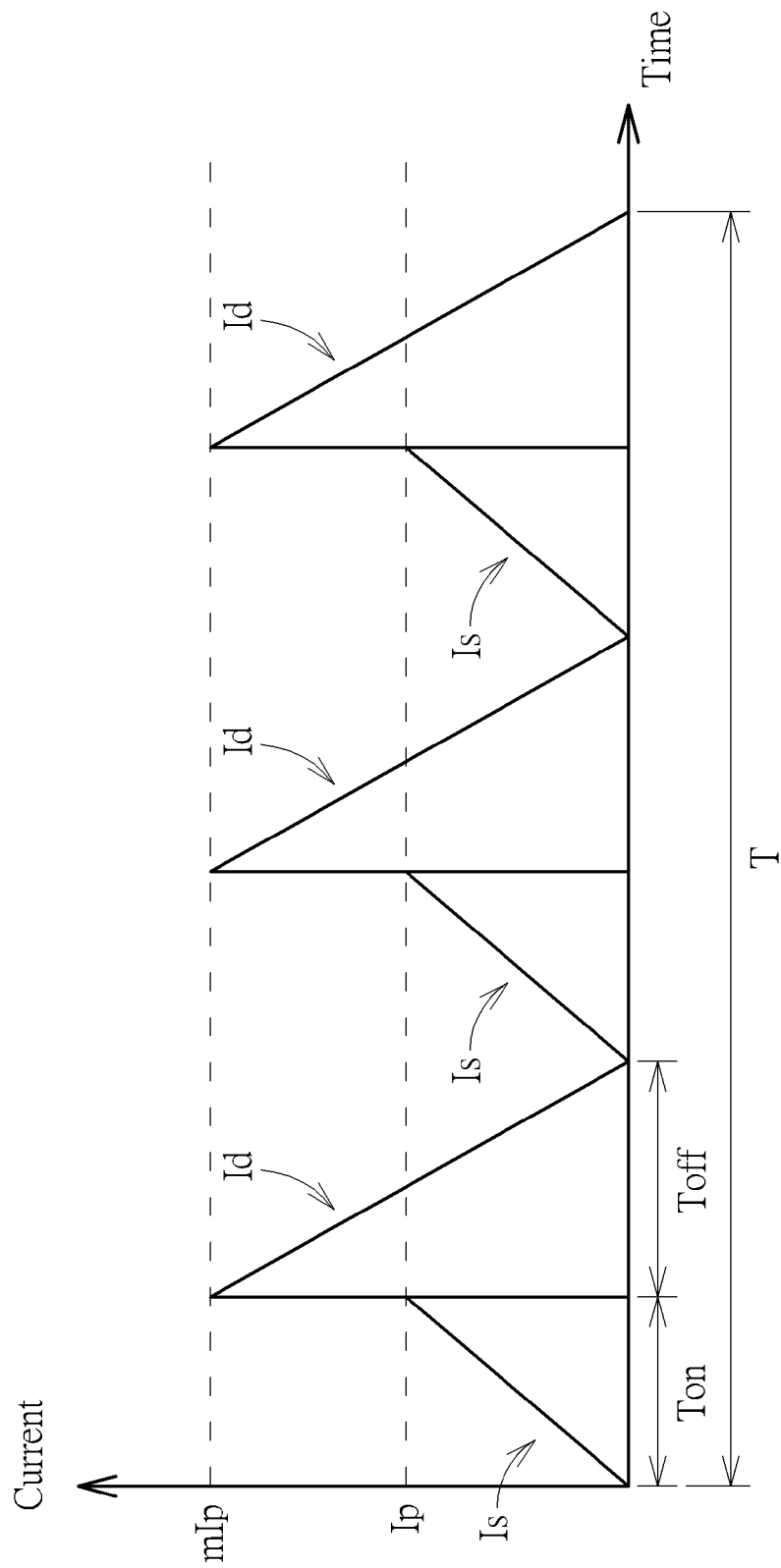
FIG. 2 is a diagram showing waveforms of related current signals when an input voltage of the power converter is at a lower level.
Figure 3:
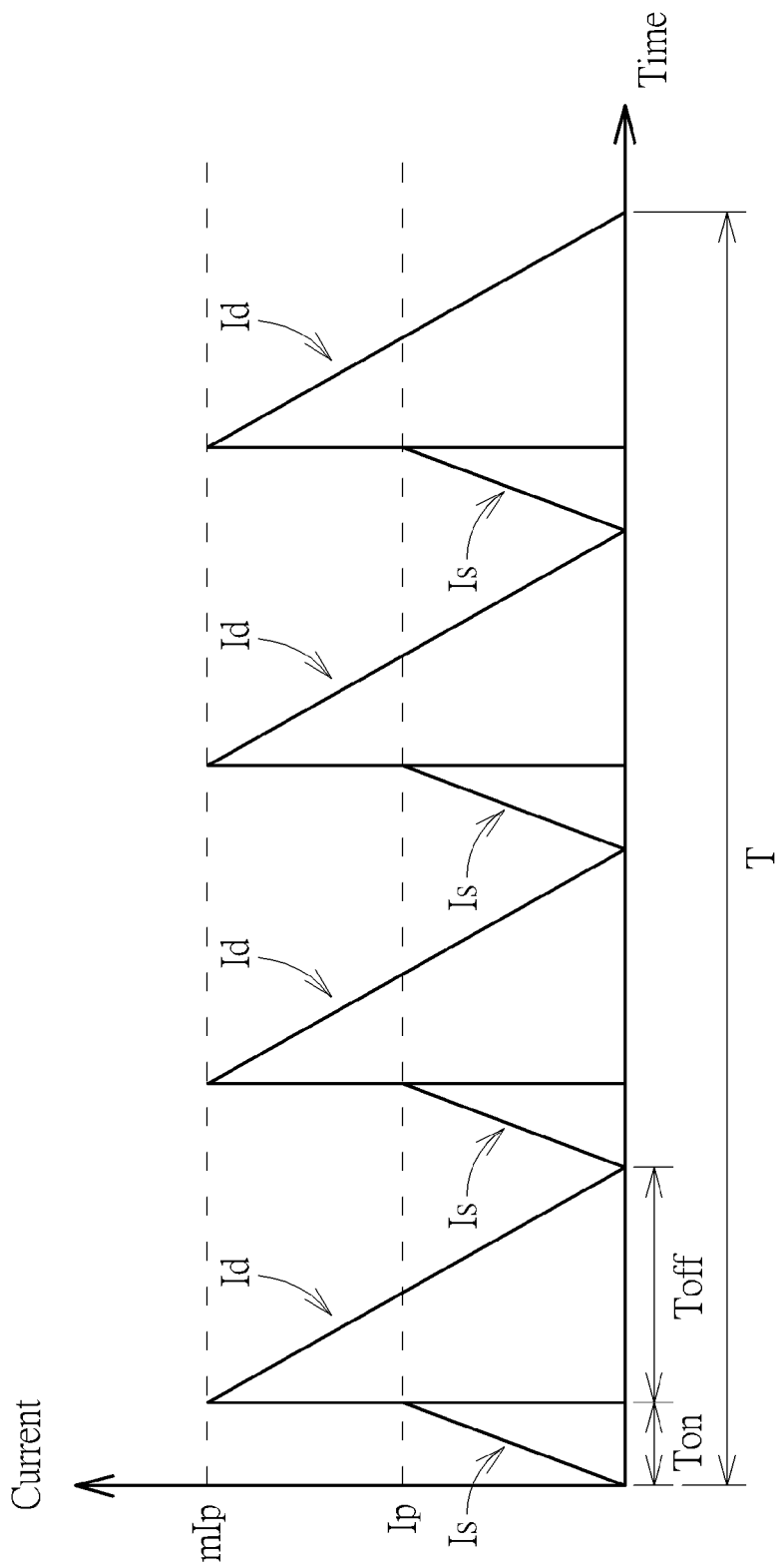
FIG. 3 is a diagram showing waveforms of related current signals when the input voltage of the power converter is at a higher level.
Figure 4:
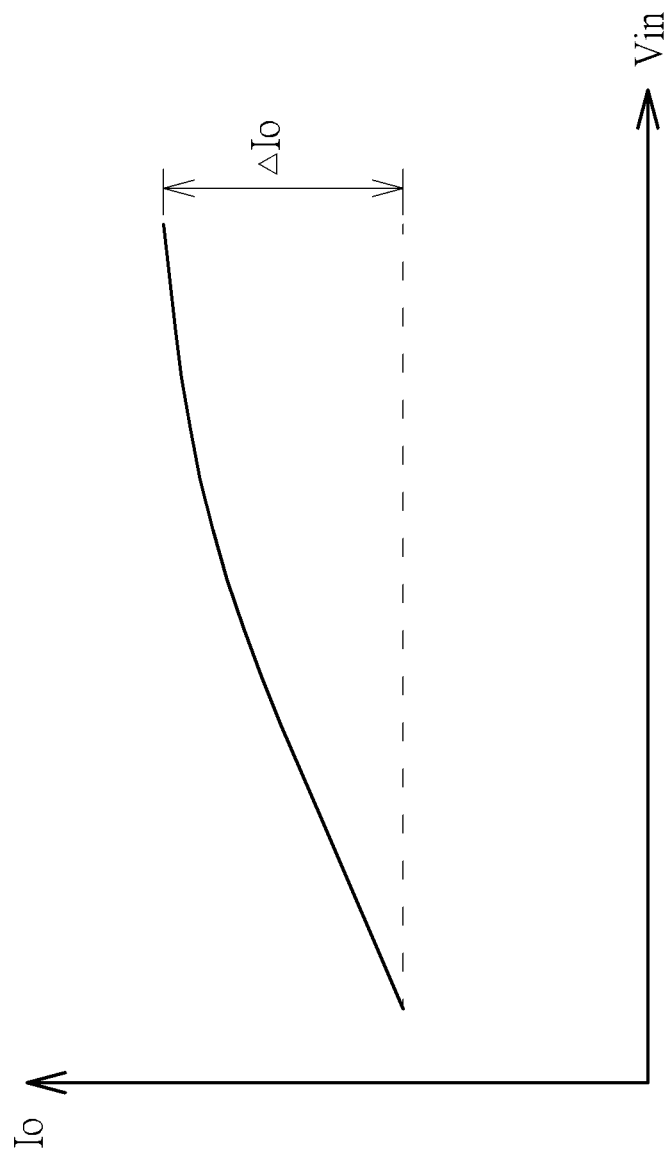
FIG. 4 is a diagram showing a relationship curve between an input voltage and an average output current of the power converter of the prior art under a constant current mode.
Figure 5:
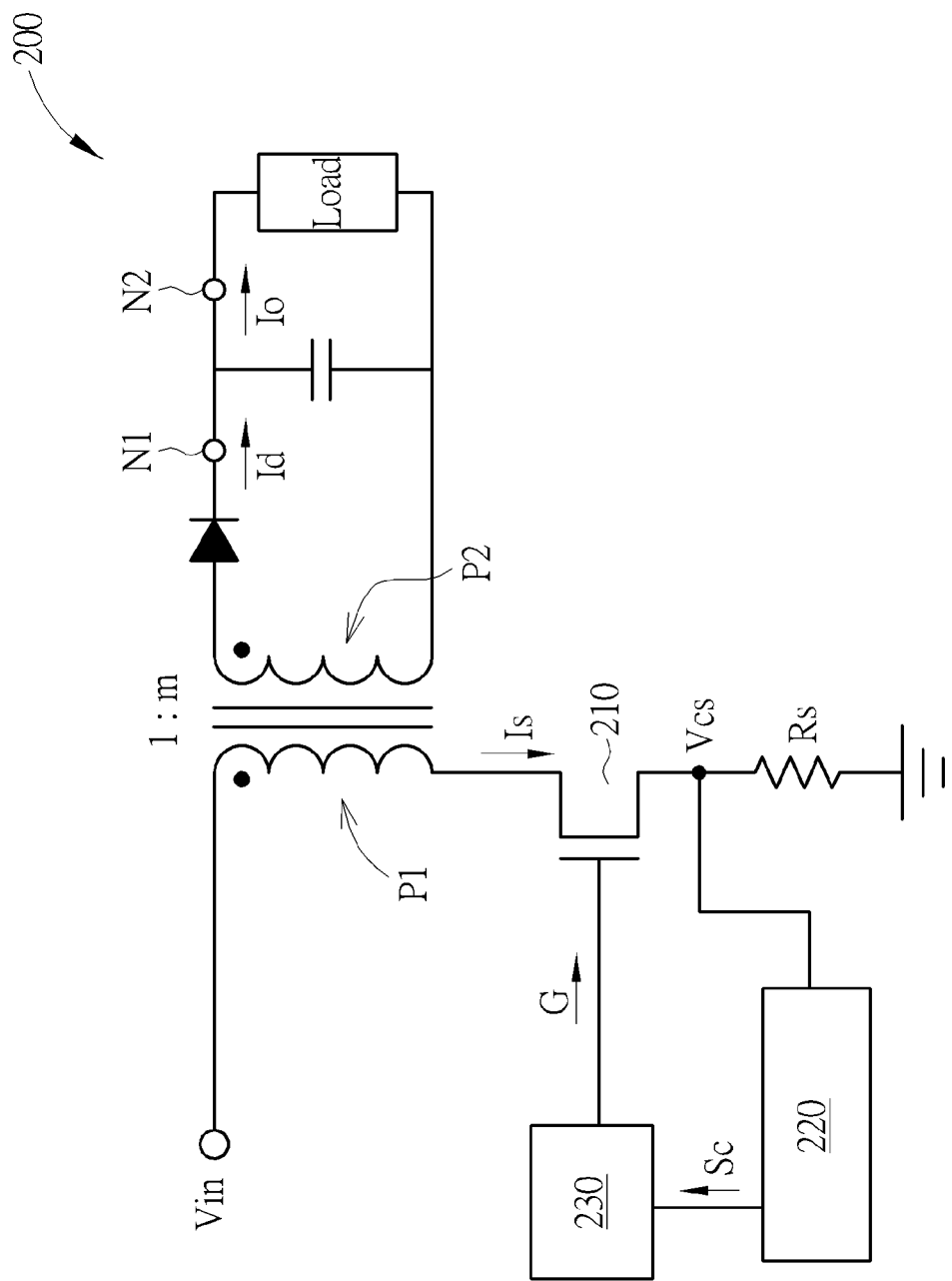
FIG. 5 is a diagram showing a power converter of the present invention.
Figure 6:
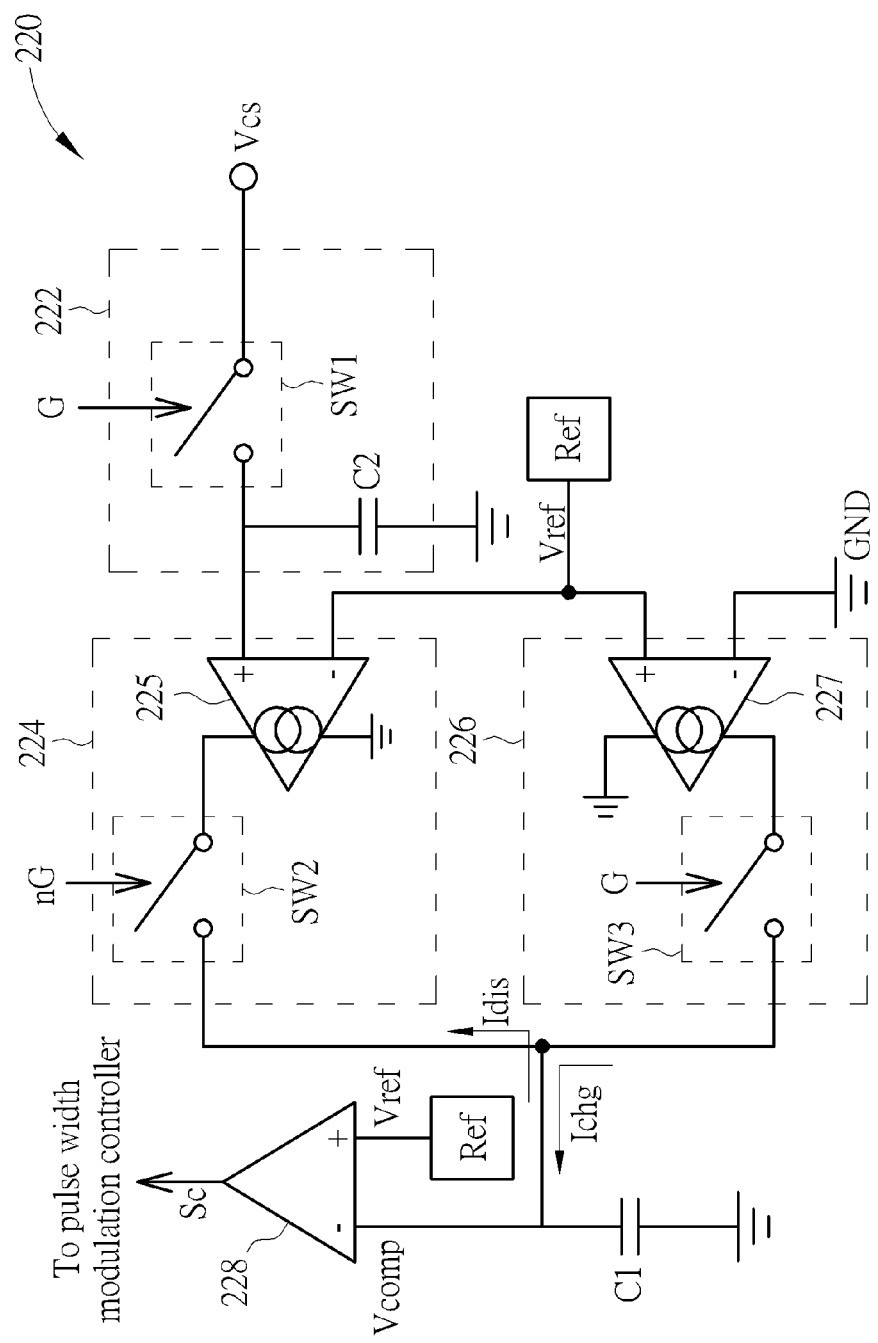
FIG. 6 is a diagram showing a constant current control circuit of the power converter in FIG. 5.

Please refer to FIG. 5 and FIG. 6 together. FIG. 5 is a diagram showing a power converter of the present invention. FIG. 6 is a diagram showing a constant current control circuit of the power converter in FIG. 5. As shown in figures, the power converter 200 of the present invention comprises a power switch 210 coupled to a primary winding P1 of the power converter 200, and a current sensing resistor Rs coupled to the power switch 210. The power switch 210 is configured to control a level of a current Is flowing through the power switch 210. The current sensing resistor Rs is configured to generate a corresponding current sensing voltage Vcs according the level of the current Is flowing through the power switch 210. The constant current control circuit 220 of the power converter 200 of the present invention comprises a sample and hold unit 222, a first capacitor C1, a discharge unit 224, a charge unit 226 and a comparator 228. The sample and hold unit 222 is coupled to the current sensing resistor Rs of the power converter 200, for storing a current sensing voltage Vcs of the current sensing resistor Rs. The first capacitor is configured to store a comparison voltage Vcomp. The discharge unit 224 is coupled between the sample and hold unit 222 and the first capacitor C1, for controlling a level of a discharge current I dis of the first capacitor C1 according to a reference voltage Vref and the current sensing voltage Vcs stored in the sample and hold unit 222 when the power switch is turned off (when a reverse gate signal nG, which is opposite to a gate signal G of the power switch 210, is at a high logic level). The charge unit 226 is coupled to the first capacitor C1, for controlling a level of a charging current Ichg of the first capacitor C1 according to the reference voltage Vref and a ground voltage Vgnd when the power switch 210 is turned on (when the gate signal G of the power switch 210 is at the high logic level). The comparator 228 is configured to compare the comparison voltage Vcomp with the reference voltage Vref to generate a comparison result, and outputting a control signal Sc according to the comparison result, in order to control a duty cycle of the power converter 200.

The sample and hold unit 222 comprises a switch SW1 and a second capacitor C2. A first end of the switch SW1 is coupled to the current sensing resister Rs for receiving the current sensing voltage Vcs of the current sensing resister Rs. A second end of the switch SW1 is coupled to the second capacitor C2. The switch SW1 is configured to conduct the first end and the second end of the switch SW1 when the power switch 210 is turned on (when the gate signal G of the power switch 210 is at the high logic level), such that the second capacitor C2 can store a peak value of the current sensing voltage Vcs. Since the current sensing voltage Vcs corresponds to the level of the current Is flowing through the power switch 210, and the current Is flowing through the power switch 210 and an output current Id of the power converter 200 are proportioned in a fixed ratio 1:m, the peak value of the current sensing voltage Vcs stored in the second capacitor C2 corresponds to a maximum level of the output current Id.

The discharge unit comprises a switch SW2 and a voltage controlled current source 225. A first end of the switch SW2 is coupled to the first capacitor C1. A second end of the switch SW2 is coupled to the voltage controlled current source 225. The switch is configured to conduct the first end and the second end of the switch SW2 when the power switch 210 is turned off. The voltage controlled current source 225 is further coupled to the sample and hold unit 222 and a reference voltage source Ref. The reference voltage Vref provided by the reference voltage source Ref corresponds to a reference current. When the first end and the second end of the switch SW2 are conducted, the voltage controlled current source 225 controls the level of the discharge current Idis of the first capacitor C1 according to a voltage difference between the reference voltage Vref provided by the reference voltage source Ref and the current sensing voltage Vcs stored in the sample and hold unit 222. The level of the discharge current Id is and the voltage difference between the reference voltage Vref and the current sensing voltage Vcs are proportioned in a predetermined ratio.

The charge unit comprises a switch SW3 and a voltage controlled current source 227. A first end of the switch SW3 is coupled to the first capacitor C1. A second end of the switch SW3 is coupled to the voltage controlled current source 227. The switch SW3 is configured to conduct the first end and the second end of the switch SW3 when the power switch 210 is turned on. The voltage controlled current source 227 is further coupled to the reference voltage source Ref and a ground end GND. When the first end and the second end of the switch SW3 are conducted, the voltage controlled current source 227 controls the level of the charging current Ichg of the first capacitor C1 according to a voltage difference between the reference voltage Vref provided by the reference voltage source Ref and the ground voltage Vgnd provided by the ground end GND. The level of charging current Ichg and the voltage difference between the reference voltage Vref and the ground voltage Vgnd are proportioned in a predetermined ratio.

According to the above arrangement, since the first capacitor C1 is charged when the power switch 210 is turned on, and discharged when the power switch 210 is turned off, the comparison voltage Vcomp stored in the first capacitor C1 corresponds to an average output current Io at a load end N2 of the power converter 200. In addition, the comparison voltage Vcomp stored in the first capacitor C1 is changed when a ratio between a turn-on time length and a turn-off time length of the power switch 210 is changed. In other words, when an input voltage Vin of the power converter 200 is changed, change of the comparison voltage Vcomp stored in the first capacitor C1 can actually reflects change of the average output current Io of the power converter 200.

Therefore, the comparator 228 can output the corresponding control signal Sc to a pulse width modulation controller 230 of the power converter 200 according to the change of the comparison voltage Vcomp stored in the first capacitor C1 in order to control the duty cycle of the power converter 200, and further compensate the change of the average output current Io caused by the change of the input voltage Vin.

Figure 7:
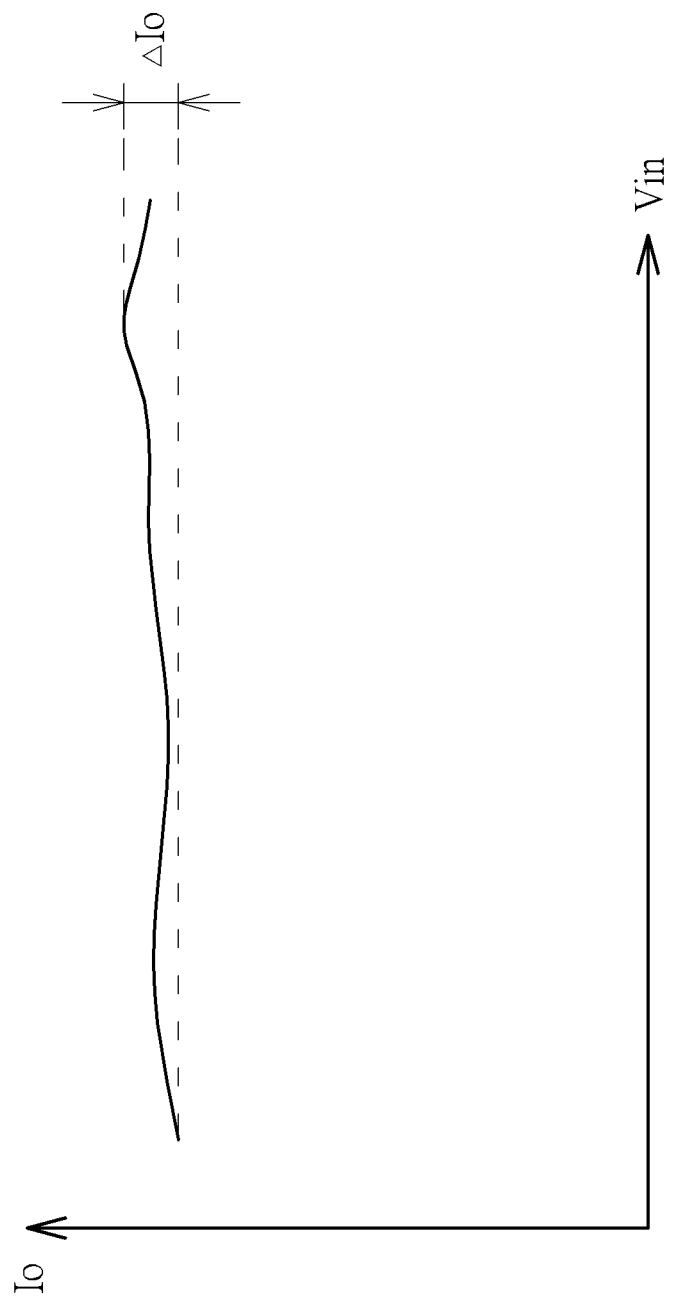
FIG. 7 is a diagram showing a relationship curve between an input voltage and an average output current of the power converter of the present invention under a constant current mode.

For example, please refer to FIG. 7. FIG. 7 is a diagram showing a relationship curve between the input voltage and the average output current of the power converter of the present invention under a constant current mode. As shown in FIG. 7, since the average output current Io of the power converter 200 is compensated by the constant current control circuit 220 for change of the input voltage yin, when the input voltage Vin of the power converter 200 of the present invention is changed, the average output current Io of the power converter 200 has smaller variation, that is to say, the power converter 200 of the present invention has good line regulation under the constant current mode by utilizing the constant current control circuit 220.

Figure 8:
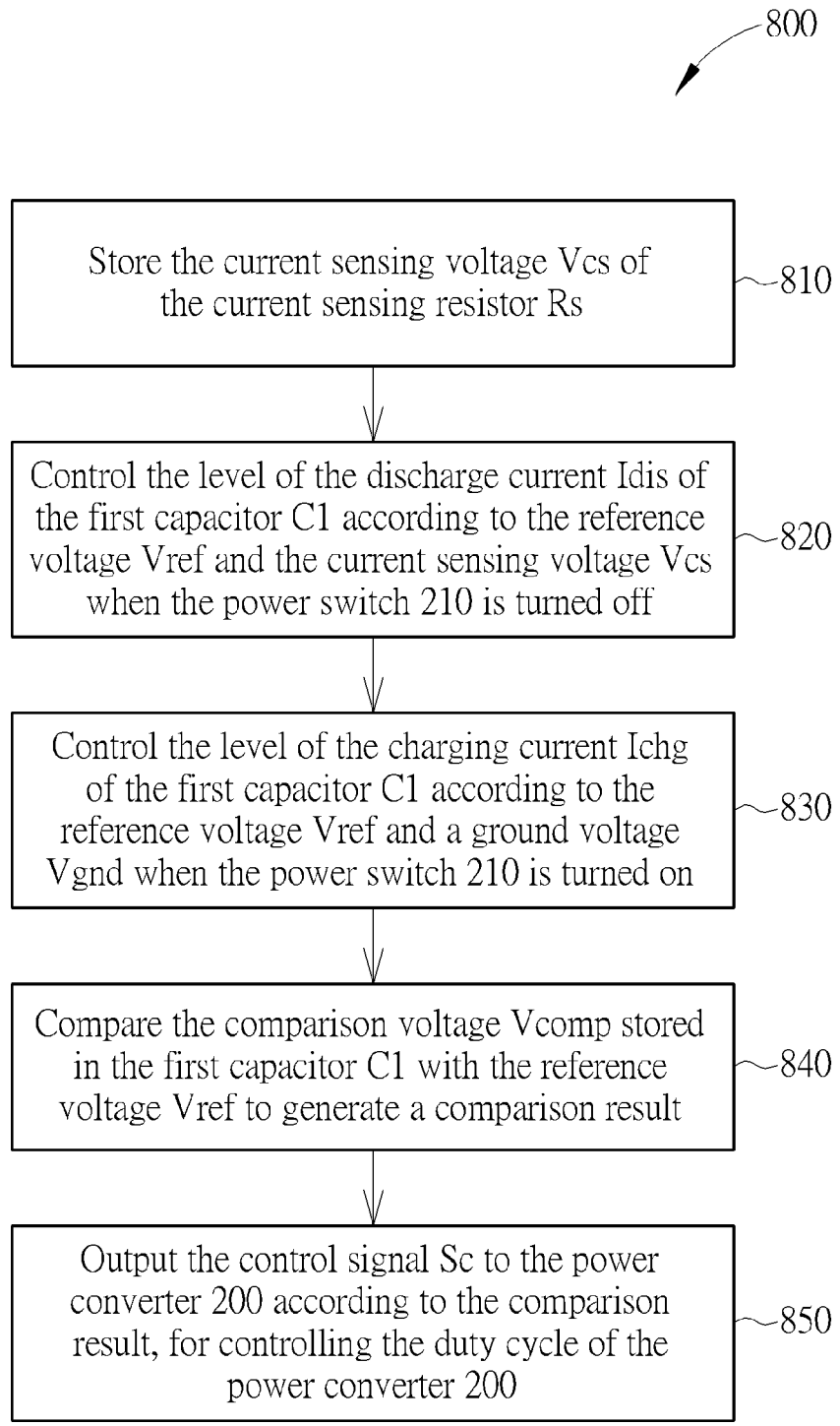
FIG. 8 is a flowchart showing a constant current control method for the power converter of the present invention.

Please refer to FIG. 8. FIG. 8 is a flowchart 800 showing a constant current control method for a power converter of the present invention. The flowchart of the constant current control method of the present invention comprises the following steps:

Step 810: Store the current sensing voltage Vcs of the current sensing resistor Rs;

Step 820: Control the level of the discharge current Idis of the first capacitor C1 according to the reference voltage Vref and the current sensing voltage Vcs when the power switch 210 is turned off;

Step 830: Control the level of the charging current Ichg of the first capacitor C1 according to the reference voltage Vref and a ground voltage Vgnd when the power switch 210 is turned on;

Step 840: Compare the comparison voltage Vcomp stored in the first capacitor C1 with the reference voltage Vref to generate a comparison result; and Step 850: Output the control signal Sc to the power converter 200 according to the comparison result, for controlling the duty cycle of the power converter 200.

In contrast to the prior art, the constant current control circuit of the power converter of the present invention can compensate the average output current of the power converter according to the change of the input voltage of the power converter, such that variation of the average output current of the power converter is smaller, so as to improve line regulation of the power converter, in order to provide a more stable power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A constant current control circuit for a power converter, the power converter comprising a power switch coupled to a primary winding of the power converter, and a current sensing resistor coupled to the power switch, the constant current control circuit comprising:
   a sample and hold unit coupled to the current sensing resistor of the power converter, for storing a current sensing voltage of the current sensing resistor;
   a first capacitor for storing a comparison voltage;
   a discharge unit coupled between the sample and hold unit and the first capacitor, for controlling a level of a discharge current of the first capacitor according to a reference voltage and the current sensing voltage stored in the sample and hold unit when the power switch is turned off;
   a charge unit coupled to the first capacitor, for controlling a level of a charging current of the first capacitor according to the reference voltage and a ground voltage when the power switch is turned on; and
   a comparator for comparing the comparison voltage with the reference voltage to generate a comparison result, and outputting a control signal according to the comparison result, in order to control a duty cycle of the power converter.

2. The constant current control circuit of claim 1, wherein the sample and hold unit comprises:
   a switch having a first end coupled to the current sensing resister, and a second end, the switch being configured to conduct the first end and the second end when the power switch is turned on; and
   a second capacitor coupled to the second end of the switch, for storing the current sensing voltage.

3. The constant current control circuit of claim 1, wherein the discharge unit comprises:
   a switch having a first end coupled to the first capacitor, and a second end, the switch being configured to conduct the first end and the second end when the power switch is turned off; and
   a voltage controlled current source coupled to the second end of the switch, the sample and hold unit and a reference voltage source, for controlling the level of the discharge current of the first capacitor according to the reference voltage provided by the reference voltage source and the current sensing voltage stored in the sample and hold unit.

4. The constant current control circuit of claim 1, wherein the charge unit comprises:
   a switch having a first end coupled to the first capacitor, and a second end, the switch being configured to conduct the first end and the second end when the power switch is turned on; and
   a voltage controlled current source coupled to the second end of the switch, a reference voltage source and a ground end, for controlling the level of the charging current of the first capacitor according to the reference voltage provided by the reference voltage source and the ground voltage provided by the ground end.

5. The constant current control circuit of claim 1, wherein a turn-off time length of the power switch is a fixed value.

6. The constant current control circuit of claim 1, wherein the sample and hold unit stores the current sensing voltage of the current sensing resister when the power switch is turned on.

7. A constant current control method for a power converter, the power converter comprising a power switch coupled to a primary winding of the power converter, and a current sensing resistor coupled to the power switch, the method comprising:
   storing a current sensing voltage of the current sensing resistor;
   controlling a level of a discharge current of a first capacitor according to a reference voltage and the current sensing voltage when the power switch is turned off;
   controlling a level of a charging current of the first capacitor according to the reference voltage and a ground voltage when the power switch is turned on;
   comparing a comparison voltage stored in the first capacitor with the reference voltage to generate a comparison result; and
   outputting a control signal according to the comparison result, for controlling a duty cycle of the power converter.

8. The constant current control method of claim 7, wherein controlling a duty cycle of the power converter, is controlling a turn-on time length of the power switch.

* * * * *